(12) United States Patent
Yu et al.

(10) Patent No.: US 9,323,664 B2
(45) Date of Patent: Apr. 26, 2016

(54) TECHNIQUES FOR IDENTIFYING READ/WRITE ACCESS COLLISIONS FOR A STORAGE MEDIUM

(71) Applicant: Intel Corporation, Santa Clara, CA (US)

(72) Inventors: Jason K. Yu, Burnaby (CA); Jawad B. Khan, Cornelius, OR (US); Joerg Hartung, Vancouver (CA); Richard P. Mangold, Forest Grove, OR (US)

(73) Assignee: INTEL CORPORATION, Santa Clara, CA (US)

( * ) Notice: Subject to any disclaimer, the term of this patent is extended or adjusted under 35 U.S.C. 154(b) by 266 days.

(21) Appl. No.: 13/948,702

(22) Filed: Jul. 23, 2013

(65) Prior Publication Data
US 2015/0032936 A1    Jan. 29, 2015

(51) Int. Cl.
*G06F 12/02* (2006.01)
*G06F 3/06* (2006.01)

(52) U.S. Cl.
CPC .......... *G06F 12/0246* (2013.01); *G06F 3/0614* (2013.01); *G06F 2212/1008* (2013.01); *G06F 2212/7201* (2013.01)

(58) Field of Classification Search
CPC ............ G06F 12/0246; G06F 11/1008; G06F 2212/2022; G06F 2212/7201; G11C 16/10
USPC .................................................. 711/103, 158
See application file for complete search history.

(56) References Cited

U.S. PATENT DOCUMENTS

2014/0013026 A1\*    1/2014    Jannyavula Venkata et al. ............................. 711/103

\* cited by examiner

*Primary Examiner* — Jasmine Song
(74) *Attorney, Agent, or Firm* — Kacvinsky Daisak Bluni PLLC

(57) ABSTRACT

Examples are disclosed for identifying read/write access collisions for a storage medium. In some examples, a plurality of write access requests for access to a storage medium may be received at a controller for a storage medium. The plurality of write access requests may be associated with separate logical block address (LBA) ranges. The separate write LBA ranges may be stored to sets of first registers. A read access request to the storage medium may also be received and a read LBA range associated with the read access request may be stored to a set of second registers. The separate stored write LBA ranges may then be compared to the read LBA range to identify overlapping ranges that may indicate read/write access collisions to the storage medium. Other examples are described and claimed.

23 Claims, 6 Drawing Sheets

500

- RECEIVE, AT A PROCESSOR CIRCUIT FOR CONTROLLING A STORAGE MEDIUM, A PLURALITY OF WRITE ACCESS REQUESTS TO THE STORAGE MEDIUM, EACH WRITE ACCESS REQUEST ASSOCIATED WITH A SEPARATE LBA WRITE RANGE
  *502*

- STORE A WRITE LBA RANGE FOR EACH WRITE ACCESS REQUEST IN RESPECTIVE SETS OF FIRST REGISTERS
  *504*
  - ASSIGN A SEPARATE INDEX VALUE FOR EACH LBA RANGE
    *506*

- RECEIVE A READ ACCESS REQUEST TO THE STORAGE MEDIUM ASSOCIATED WITH A READ LBA RANGE
  *508*

- STORE THE READ LBA RANGE TO A SET OF SECOND REGISTERS
  *510*

- COMPARE THE READ LBA RANGE STORED TO THE SET OF SECOND REGISTERS TO EACH OF THE WRITE LBA RANGES STORED TO THE FIRST SET OF REGISTERS
  *512*

- DETERMINE WHETHER THE READ LBA RANGE OVERLAPS WITH ANY ONE OF THE WRITE LBA RANGES
  *514*
  - COMPARE INDEX VALUES FOR OVERLAPPING LBA RANGES
    *516*
  - INDICATE A WRITE LBA RANGE WITH A HIGHER INDEX VALUE
    *518*

*FIG. 5*

TECHNIQUES FOR IDENTIFYING READ/WRITE ACCESS COLLISIONS FOR A STORAGE MEDIUM

BACKGROUND

Computing devices to include host computing devices or systems may include the use of types of storage mediums having one or more storage devices such as solid state drives (SSDs). These types of storage devices may include non-volatile memories such as NAND flash memory. SSD devices are increasingly being deployed as storage devices that augment or even replace hard disk drives used with host computing devices. Storage controllers for or located with these types of storage mediums and/or devices may have to track a large number of outstanding read and write access requests at any given time while waiting for data to be transferred to or from the storage controller and storage device(s) for the storage medium.

BRIEF DESCRIPTION OF THE DRAWINGS

FIG. 5 illustrates an example logic flow.

DETAILED DESCRIPTION

Figure 1:
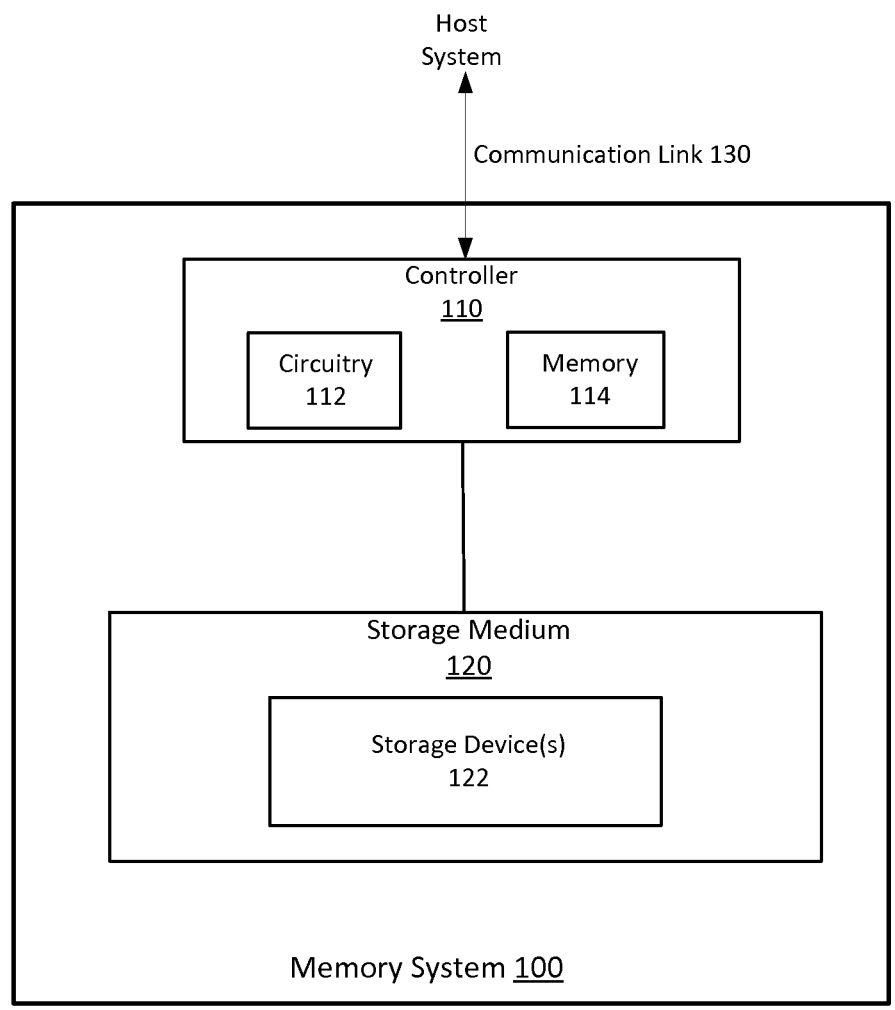
FIG. 1 illustrates an example memory system.

As contemplated in the current disclosure, storage controllers may have to track a large number of outstanding read and write access requests at any given time while waiting for data to be transferred to or from a storage medium that may include storage devices such as SSDs. According to some examples, firmware executed by circuitry (e.g., a processor circuit) of a storage controller may utilize a write access request queue to buffer write accesses to a storage medium while those write access requests are being completed/serviced by hardware for the controller. For these examples, the time required to write the data to the storage medium may be relatively long. So it may be desirable to concurrently allow read accesses from other locations of the storage medium. For SSDs, concurrent read access to other locations may work well as SSDs typically include multiple non-volatile memory devices that may be accessed independently.

In some examples, concurrent read access may not be in conflict when outstanding read and write requests are destined to different locations. For these examples, associated write and read accesses may happen out of order. However, when associated write and read accesses are destined for the same location (e.g., overlapping logical block addresses (LBAs)), changing an order of accesses can cause incorrect data to be returned to the requestor (e.g., a host computer).

According to some examples, a storage controller's firmware may be configured to prevent conflicts by checking each read access request against all outstanding write access requests to make sure there is no read/write access collisions based on overlapping LBAs. For these examples, if an overlap occurs, the read/write access requests or operations cannot be performed out of order. As this check is likely performed on every read access request against every write access request, it may be a very frequent operation. Storage medium technologies associated with accessing various types of non-volatile memory devices are advancing such that well over 100,000 read/write operations may occur per second and the number of operations per second continues to increase. The ability of a storage controller's firmware to maintain overlapping checks of read/write access requests at a rate that does not severely impact performance may be limited given this high number of read/write operations per second. It is with respect to these and other challenges that the examples described herein are needed.

In some examples, techniques associated with identifying read/write access collisions for a storage medium that may include one or more SSDs may be implemented. The techniques may include receiving, at a processor circuit for controlling a storage medium, a plurality of write access requests to the storage medium. Each write access request may be associated with a separate LBA write range. A write LBA range for each write access request may then be stored in sets of first registers. The techniques may also include receiving a read access request to the storage medium associated with a read LBA range and storing the read LBA range to a set of second registers. The read LBA range stored to the set of second registers may then be compared to each of the write LBA ranges stored to the first set of registers and a determination as to whether the read LBA range overlaps with any one of the write LBA ranges may be made. According to some examples, comparison of the stored read LBA range to each of the stored write LBA ranges may occur in a single clock cycle or may occur over several clock cycles.

FIG. 1 illustrates an example memory system 100. As shown in FIG. 1, memory system 100 includes a controller 110, a storage medium 120 and a communication link 130. According to some examples, controller 110 may receive and/or fulfill read/write access requests to storage medium 120 via communication link 130 from a host computing device or host system.

In some examples, as shown in FIG. 1, controller 110 may include circuitry 112 or memory 114. Circuitry 112 and memory 114 may include logic and/or features to include various modules capable of identifying read/write access request collisions to storage medium 120. The various modules may include a combination of firmware (e.g., stored in memory 114) and/or hardware elements (e.g., included in circuitry 112) that may be utilized to identify the read/write access request collisions based on overlapping LBAs associated with the read/write access requests to a same storage device included in storage medium 120.

In some examples, storage medium 120 may include storage device(s) 122. Storage device(s) 122 may include such storage devices such as an SSD having non-volatile memory to include, but not limited to NAND flash memory, NOR flash memory, 3-D cross-point memory, ferroelectric memory, silicon-oxide-nitride-oxide-silicon (SONOS) memory, polymer memory such as ferroelectric polymer memory, ferroelectric transistor random access memory (FeTRAM) or FeRAM), ovonic memory, nanowire or electrically erasable programmable read-only memory (EEPROM).

According to some examples, memory system 100 may be entirely included in a single SSD. For these examples, storage medium 120 may include a non-volatile memory storage medium and storage device(s) 122 may be individual non-volatile memory devices or memory arrays. Controller 110 may be located with the single SSD and arranged to receive and/or fulfill read/write access requests to these types of storage device(s) 122.

Figure 2:
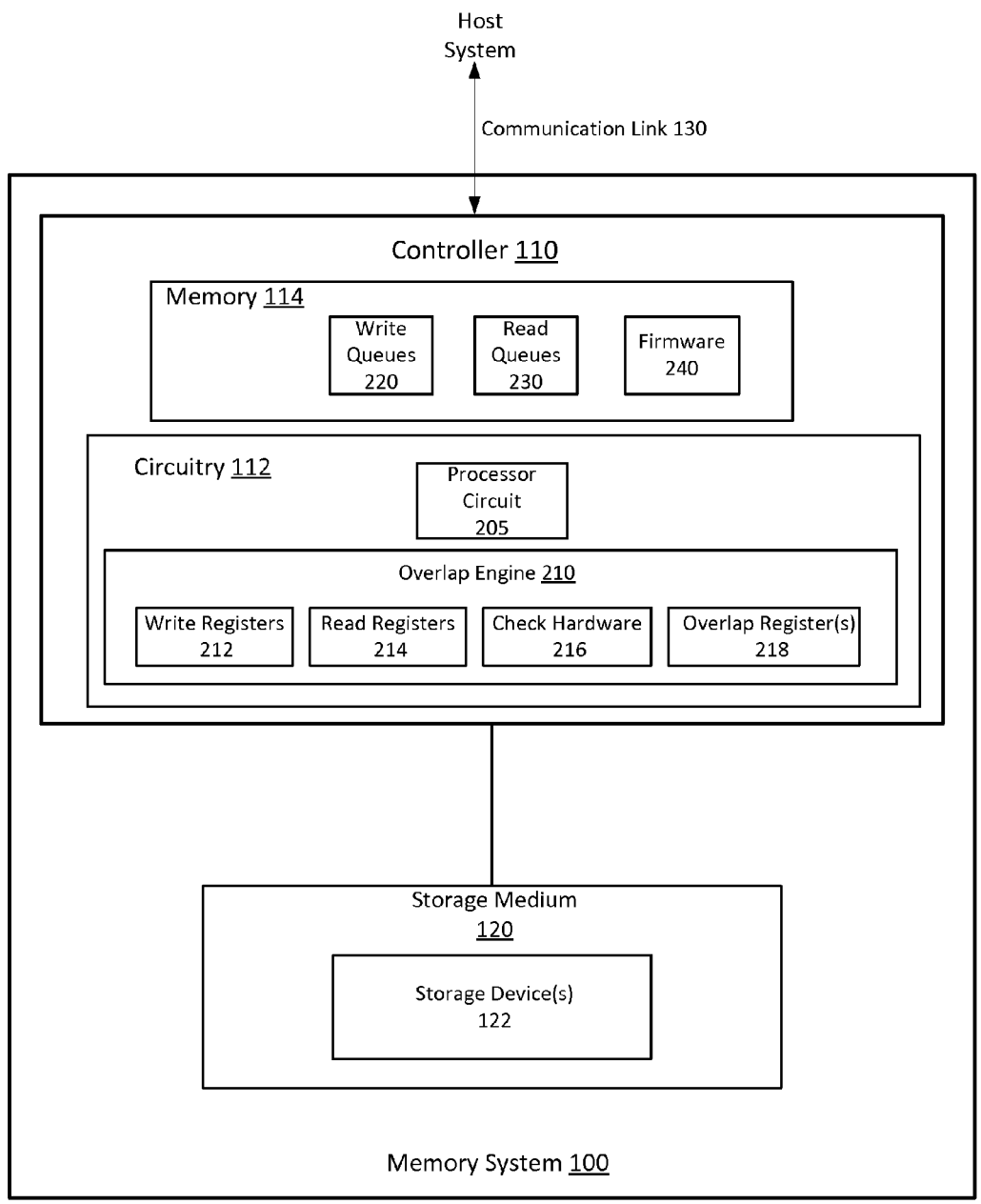
FIG. 2 illustrates more detail of an example controller for the example memory system.

FIG. 2 illustrates more detail of example controller 110 for the example memory system 100. In some examples, as shown in FIG. 2, circuitry 112 includes a processor circuit 205 and an overlap engine 210. Also, as shown in FIG. 2, memory 114 includes write queues 220, read queues 230 and firmware 240. As described more below, these elements of circuitry 112 and memory 114 may be arranged to identify read/write access request collisions to storage medium 120 based on overlapping LBAs associated with read/write access request to a same storage device included in storage device(s) 122 or storage medium 120.

As shown in FIG. 2, overlap engine 210 of circuitry 112 includes write registers 212, read registers 214, check hardware 216 or overlap register(s) 218. According to some examples, logic and/or features to include various modules for execution by processor circuit 205 may utilize at least some of the above-mentioned elements of overlap engine 210 to determine whether a read LBA range for a given read access request to storage medium 120 overlaps with any one write LBA range for a plurality of outstanding write access requests to storage medium 120. For these examples, the plurality of outstanding write access requests may be at least temporarily stored in write queues 220 and the read access request may be at least temporarily stored in read queues 230.

In some examples, logic and/or features to include various modules for execution by processor circuit 205 may receive a plurality of write access requests to storage medium 120. For these examples, each of the write access requests may be associated with a separate LBA write range. The separate LBA write ranges having respective start and end LBAs. The logic and/or features may then store a write LBA range for each write access request in respective sets of registers included in write registers 212. The logic and/or features may receive a read access request to storage medium 120 that may be associated with a read LBA range. The read LBA range having a start LBA and an end LBA. The logic and/or features may then store the read LBA range to read registers 214. The logic and/or features may then compare the read LBA range stored to read registers 214 to each of the write LBA ranges stored to write registers 212 using check hardware 216. Based at least in part on the comparisons, the logic and/or features may determine whether the read LBA range overlaps with any one of the write LBA ranges.

According to some examples, an indication of determined overlaps may be stored to overlap register(s) 218. For these examples, firmware 240 may be capable of accessing overlap register(s) 218 and may cause a delay to the read access having the determined overlap with at least one of the write access requests. The delay, for example, may be associated with the most recently received write access request having the determined overlap.

Figure 3:
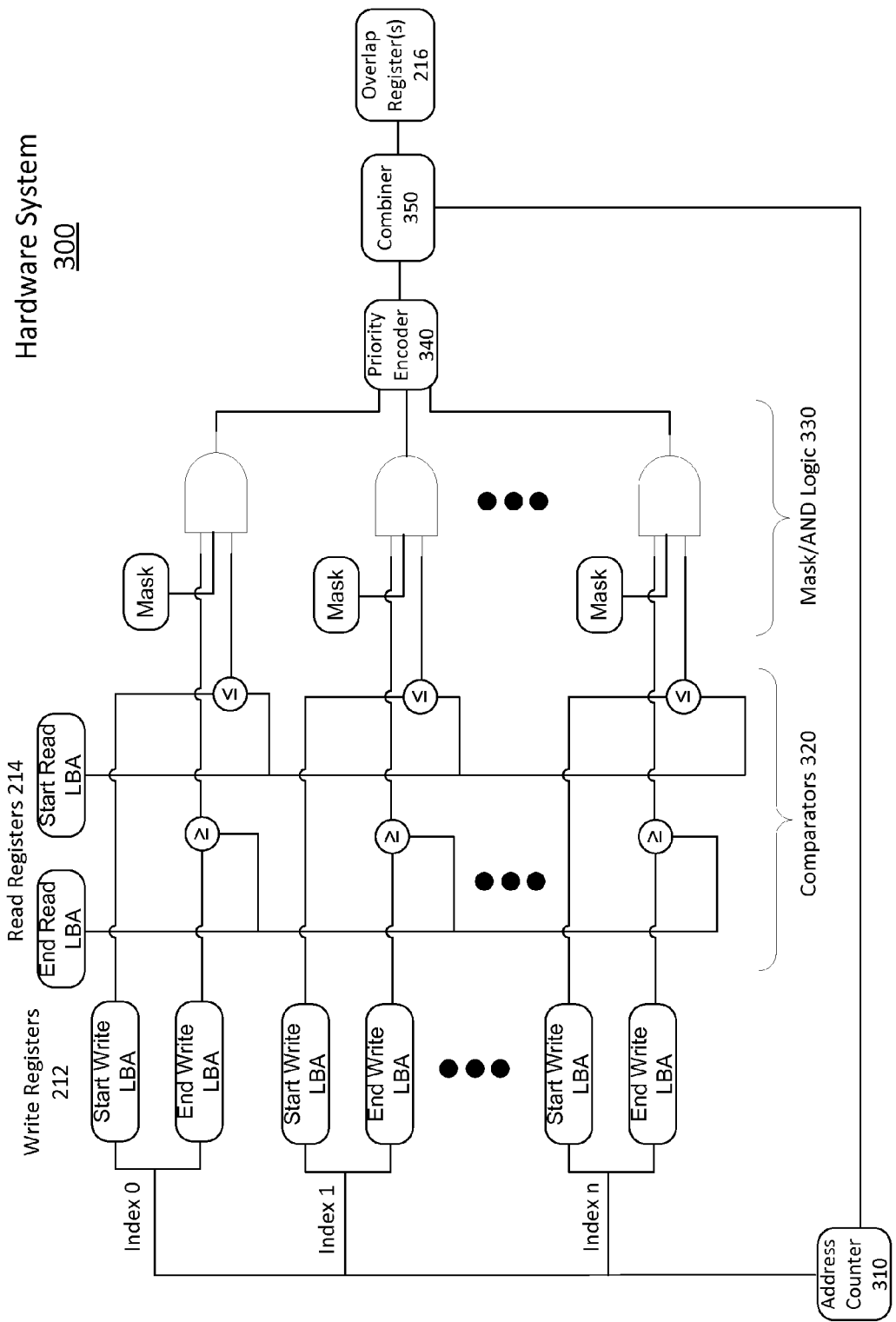
FIG. 3 illustrates an example hardware system.

FIG. 3 illustrates an example hardware system 300. As shown in FIG. 3, hardware system 300 includes respective sets of write registers 212 separately coupled to respective pairs of comparators 320. Also, as shown in FIG. 3, end read and start read LBAs stored in read registers 214 may also be coupled to comparators 320. According to some examples, outputs of the respective pairs of comparators 320 may be routed to separate mask/AND logic 330.

In some examples, outputs from each mask/AND logic 330 may be routed to priority encoder 340. Priority encoder 340 may identify the most recent write access request having an overlapping write LBA with a read LBA for a read access request for each comparison iteration, e.g., based on processor circuit 205 duty or clock cycles. Priority encoder 340 may relay the most recent overlapping write LBA to combiner 350 to possibly combine results for multiple iterations. Also, in some examples, address counter 310 may count iterations and provide that count to combiner 350 for use to indicate overlapping write LBA(s) for the most recent write access request in overlap register(s) 216.

According to some examples, an overlap or collision may be detected based on the following example condition (1):

(start read LBA≤end write LBA) AND (end read LBA≥start write LBA)

In some examples, logic and/or features to include various modules for execution by processor circuit 205 may assign a separate index value to each write LBA range. For these examples, the separate index value may indicate a relative time of a given write LBA range for a given write access request compared to other write LBA ranges for other write access requests. A higher index value may be associated with a more recent write access request stored in write queues 220. For example, index 0 as shown in FIG. 3 for the first set of registers for write registers 212 may indicate the start write and end write LBAs are for the oldest write access requests stored in write queues 220. Meanwhile index n (where "n" represents any positive integer>1) may indicate the start write and end write LBAs for the highest index value and hence the most recent write access request stored in write queues 220.

According to some examples, priority encoder 340 may be capable of comparing index values for first and second write LBA ranges stored to write registers 212 based on these write LBA ranges having overlapping ranges with the read LBA range stored to read register 214. For example, if the write LBA ranges assigned to index 0 and the write LBA ranges assigned to index 1 were determined to overlap with the read LBA range, the higher index value for index 1 would indicate that the write access request for this write LBA range is the more recent of the two overlapping write access requests. Priority encoder 340 may then place a higher priority on the write LBA range assigned to index 1 and then relay that write LBA range to combiner 350.

In some examples, combiner 350 may work in cooperation with address counter 310 to in the event that multiple iterations are needed to compare all write LBA ranges stored to write registers 212. Multiple iterations may be needed if hardware system 300 does not have enough comparators 320 and/or mask/logic 330 to check all the write LBA ranges for overlap in a single iteration (e.g., single clock cycle). In some examples, address counter 310 may be configured or arranged to count iterations completed and then indicate to combiner 350 the cumulative number of iterations. Combiner 350 may use the number of iterations to determine whether or not to concatenate multiple write LBA ranges that may have been split up and compared to the read LBA range in multiple iterations.

According to some examples, logic and/or features to include various modules for execution by processor circuit 205 may receive an indication that a given write access request having a stored write LBA range stored to write registers 212 has been completed before receiving the read access request for the read LBA range stored to read registers 214. For example, the write LBA range for index 0 may be for a write access request that was completed prior to receiving the read access request. For this example, a mask for the respective mask/AND logic 330 for index 0 may be asserted. As a result of asserting the mask, a determination of whether the read LBA range overlaps with the stored write LBA range for index 0 may be interpreted as a non-overlapping LBA range, even if the write LBA range actually does overlap.

Figure 4:
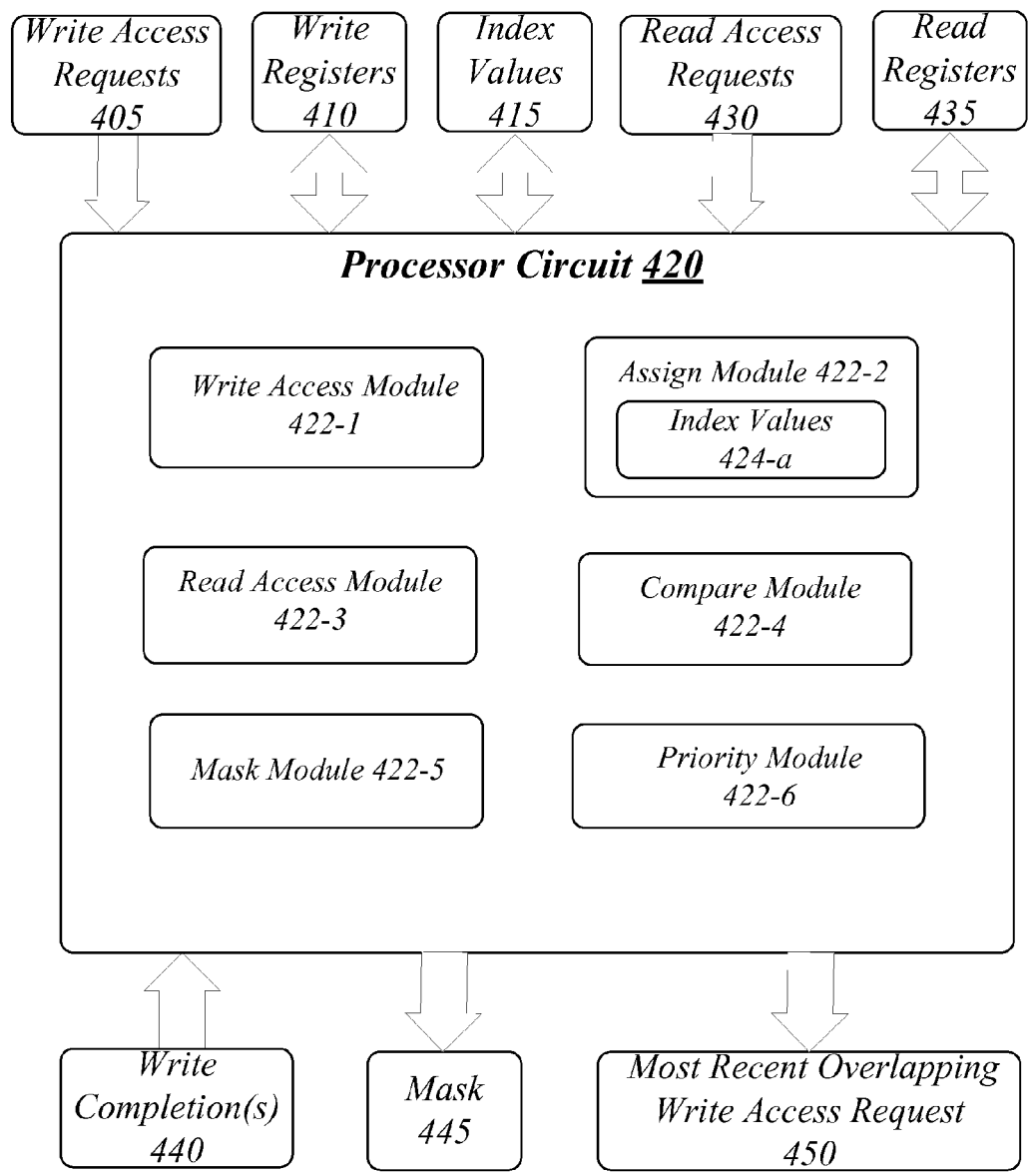
FIG. 4 illustrates an example apparatus.

FIG. 4 illustrates an example apparatus 400. Although the apparatus 400 shown in FIG. 4 has a limited number of elements in a certain topology, it may be appreciated that the apparatus 400 may include more or less elements in alternate topologies as desired for a given implementation.

The apparatus 400 may comprise a computer-implemented apparatus that may include at least some of the logic and/or features mentioned above for controller 110 for FIGS. 1-3. The computer-implemented apparatus 400 may be arranged to execute one or more software modules 422-*a*. It is worthy to note that "a" and "b" and "c" and similar designators as used herein are intended to be variables representing any positive integer. Thus, for example, if an implementation sets a value for a=6, then a complete set of software modules 422-*a* may include modules 422-1, 422-2, 422-3, 422-4, 422-5 or 422-6. The examples are not limited in this context.

According to some examples, apparatus 400 may be capable of being located with a memory system such as memory system 100 (e.g., included in controller 110). For these examples, apparatus 400 may be included in or implemented by a processor, processor circuitry or processor circuit. In other examples, at least some portions of apparatus 400 may be implemented as part of firmware for a controller of the memory system. The examples are not limited in this context.

In some examples, if implemented in a processor, the processor may be generally arranged to execute one or more modules 422-*a*. The processor can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Core i3, Core i5, Core i7, Pentium®, and XScale® processors; and similar processors. According to some examples processor circuit 420 may also be an application specific integrated circuit (ASIC) and at least some modules 422-*a* may be implemented as hardware elements of the ASIC.

According to some examples, apparatus 400 may include a write access module 422-1. Write access module 422-1 may be executed by processor circuit 420 to receive a plurality of write access request to a storage medium controlled by a controller that may include apparatus 400. For these examples, the plurality of write requests may be included in write access requests 405 and each write access request may be associated with a separate LBA range. Write access module 422-1 may maintain or store a write LBA range for each write access request in respective sets of registers included in write registers 410.

In some examples, apparatus 400 may also include an assign module 422-2. Assign module 422-2 may be executed by processor circuit 420 to assign a separate index value to each stored write LBA range stored to write registers 410. For these examples, the separate index value may be included in index values 415 and may indicate a relative time of a given stored write LBA range for a given write access request compared to other stored write LBA ranges for other write access requests included in write access requests 405. Assign module 422-2 may be capable of at least temporarily storing index values 424-*a* (e.g., in a lookup table (LUT)).

According to some examples, apparatus 400 may also include a read access module 422-3. Read access module 422-3 may be executed by processor circuit 420 to receive a read access request to the storage medium associated with a read LBA range. For these examples, the read access request may be included in read access request 430. Read access module 422-3 may maintain or store the read LBA range to a set of registers included in read registers 435.

In some examples, apparatus 400 may also include a compare module 422-4. Compare module 422-4 may be executed by processor circuit 420 to compare the read LBA range stored to read registers 435 to each of the write LBA ranges stored to write registers 410 to determine whether the read LBA range overlaps with any one of the write LBA ranges. For these examples, compare module 422-4 may utilize hardware elements for the comparison such as the comparators and logic ANDs shown above for FIG. 3.

In some examples, apparatus 400 may also include a mask module 422-5. Mask module 422-5 may be executed by processor circuit 420 to mask a determination of whether read LBAs stored to read registers 435 overlap with the write LBAs stored to write registers 410. For these examples, mask module 422-5 may provide a mask included in mask 445 to compare module 422-4 based on write access module 422-1 receiving write completions 440 that may indicate given write access requests have been completed before receiving the read access request included in read access request 430.

According to some examples, apparatus 400 may also include a priority module 422-6. Priority module 422-6 may be executed by processor circuit 420 to compare index values included in index values 415 for overlapping write LBA ranges as determined by compare module 422-4. For these examples, priority module 422-6 may indicate the overlapping write LBA range having the highest assigned index value in the most recent overlapping write access request 450. In some examples, priority module 422-6 may cause most recent overlapping write access request 450 to be stored to registers (e.g., overlap registers) that may be accessible to firmware controlling the read/write accesses to the storage medium. The firmware may delay the read access request included in read access request 430 to occur after the most recent write access request that was included in most recent overlapping write access request 450.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 5 illustrates a logic flow 500. Logic flow 500 may be representative of some or all of the operations executed by one or more logic, features, or devices described herein, such as apparatus 400 that may be included with or is a part of a controller for a memory system such as memory system 100. More particularly, logic flow 500 may be implemented by write access module 422-1, assign module 422-2, read access module 422-3, compare module 422-4, mask module 422-5 or priority module 422-5.

According to some examples, logic flow 500 at block 502 may receive, at a processor circuit for controlling a storage medium, a plurality of write access requests to the storage medium, each write access request associated with a separate LBA write range. For these examples, write access module 422-1 may receive write access requests 405 for access to a storage medium controlled by a controller that includes apparatus 400.

In some examples, logic flow 500 at block 504 may store a write LBA range for each write access request in respective sets of first registers. Also, logic flow 500 at block 506 may assign a separate index value for each LBA range. For these examples, the write LBA ranges may be stored to write registers 410 by write access module 422-1 and the index values may be assigned by assign module 422-2 such that higher index values included in index values 415 indicate more recent write access requests.

According to some examples, logic flow 500 at block 508 may receive a read access request to the storage medium associated with a read LBA range. For these examples, read access module 422-3 may receive read access request 430 for a read access to the storage medium.

In some examples, logic flow 500 at block 510 may store the read LBA range to a set of second registers. For these examples, read access module 422-3 may store the read LBA range to read registers 435.

According to some examples, logic flow 500 at block 512 may compare the read LBA range stored to the set of second registers to each of the write LBA ranges stored to the first set of registers. For these examples, compare module 422-4 may compare the read LBA range stored to read registers 435 to each of the write LBA ranges stored to write registers 410.

In some examples, logic flow 500 at block 514 may determine whether the read LBA range overlaps with any one of the write LBA ranges. Also, logic flow 500 at block 516 may compare index values for overlapping LBA ranges and at block 518 may indicate a write LBA range with a higher index value. For these examples, compare module 422-4 may determine whether an overlap exists. If an overlap exists, priority module 422-6 may then compare index values if more than one write LBA range overlaps with the read LBA range. Priority module 422-6, in some examples, may indicate the overlapping write LBA range having a higher index value as compared to other overlapping write LBA range(s). As mentioned above, a higher index may equate to a more recent write access request. So, in some examples, the read access request may be delayed until after the write access request for the overlapping write LBA range has been completed.

Figure 6:
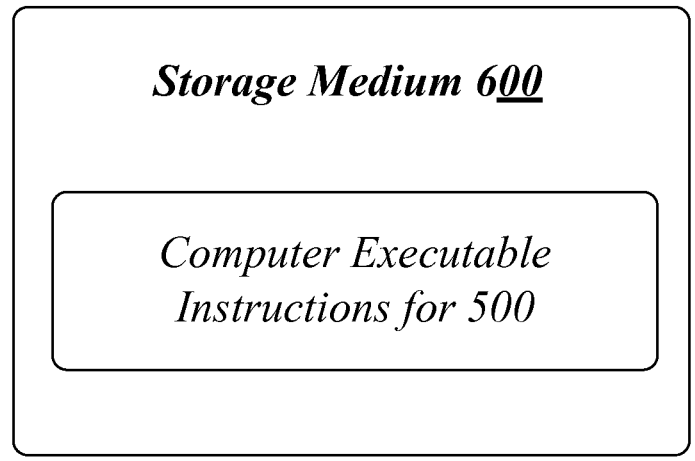
FIG. 6 illustrates an example storage medium.

FIG. 6 illustrates an embodiment of a storage medium 600. The storage medium 600 may comprise an article of manufacture. In some examples, storage medium 600 may include any non-transitory computer readable medium or machine readable medium, such as an optical, magnetic or semiconductor storage. Storage medium 600 may store various types of computer executable instructions, such as instructions to implement logic flow 500. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 7:
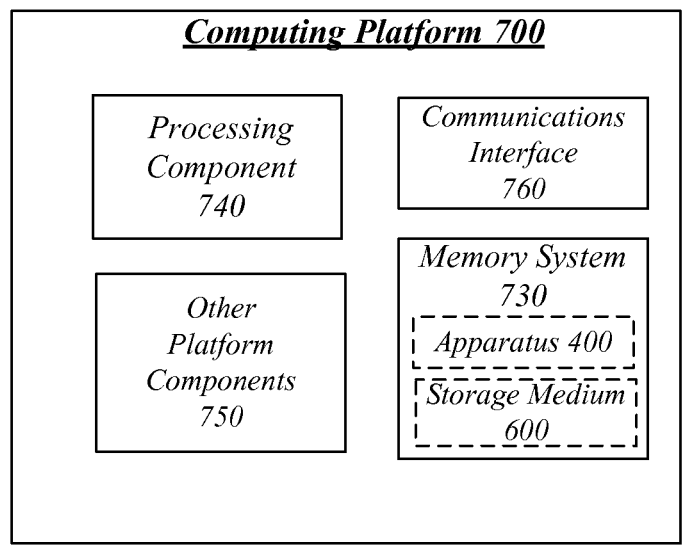
FIG. 7 illustrates an example computing platform.

FIG. 7 illustrates an example computing platform 700. In some examples, as shown in FIG. 7, computing platform 700 may include a memory system 730, a processing component 740, other platform components 750 or a communications interface 760. According to some examples, computing platform 700 may be implemented in a host system or host computing device.

According to some examples, memory system 730 may be similar to memory system 100. For these examples, logic and/or features (e.g., included in a controller) resident at or located with memory system 730 may execute at least some processing operations or logic for apparatus 500. Also, memory system 730 may include non-volatile memory (not shown) that may be written to or read from in a similar manner as described above for memory system 100.

According to some examples, processing component 740 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 750 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units associated with either other platform components 750 or memory system 730 may include without limitation, various types of computer readable and machine readable storage media in the form of one or more higher speed memory units, such as ROM, RAM, DRAM, Double-Data-Rate DRAM (DDRAM), synchronous DRAM (SDRAM), SRAM, programmable ROM (PROM), EPROM, EEPROM, NAND flash memory, NOR flash memory, polymer memory such as ferroelectric polymer memory, ferroelectric transistor random access memory (FeTRAM or FeRAM), nanowire, ovonic memory, ferroelectric memory, 3-dimensional cross-point memory, SONOS memory, magnetic or optical cards, an array of devices such as Redundant Array of Independent Disks (RAID) drives, solid state memory devices (e.g., USB memory), SSDs and any other type of storage media suitable for storing information.

In some examples, communications interface 760 may include logic and/or features to support a communication interface. For these examples, communications interface 760 may include one or more communication interfaces that operate according to various communication protocols or standards to communicate over direct or network communication links. Direct communications may occur via use of communication protocols or standards described in one or more industry standards (including progenies and variants) to include the Peripheral Component Interconnect (PCI) Express Base Specification, revision 3.0, published in November 2010 ("PCI Express" or "Pie"), the Non-Volatile Memory Express (NVMe) Specification, revision 1.1, published in October 2012, the Serial ATA (SATA) Specification, revision 3.1, published in July 2001 and/or the Serial Attached SCSI (SAS) Specification, revision 2.1, published in December 2010. Network communications may occur via use of various communication protocols and may operate in compliance with one or more promulgated standards or specifications for wired or wireless networks by the Institute of Electrical Engineers (IEEE). These standards are specifications may include, but are not limited to, IEEE 802.11-2012 Standard for Information technology—Telecommunications and information exchange between systems—Local and metropolitan area networks—Specific requirements Part 11: WLAN Media Access Controller (MAC) and Physical Layer (PHY) Specifications, published March 2012, and/or later versions of this standard ("IEEE 802.11") for wireless mediums or IEEE 802.3-2008, Carrier sense Multiple access with Collision Detection (CSMA/CD) Access Method and Physical Layer Specifications, Published in December 2008 (hereinafter "IEEE 802.3") for wired mediums.

Computing platform 700 may be part of a host system or host computing device that may be, for example, user equipment, a computer, a personal computer (PC), a desktop computer, a laptop computer, a notebook computer, a netbook computer, a tablet computer, a tablet, a portable gaming console, a portable media player, a smart phone, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 700 described herein, may be included or omitted in various embodiments of computing platform 700, as suitably desired.

The components and features of computing platform 700 may be implemented using any combination of discrete circuitry, application specific integrated circuits (ASICs), logic gates and/or single chip architectures. Further, the features of computing platform 700 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 700 shown in the block diagram of FIG. 7 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

In some examples, an example apparatus to control a storage medium may include circuitry, first registers and second registers. The example apparatus may also include a write access module for execution by the processor circuit that may receive a plurality of write access requests to the storage medium. For these examples, each write access request may be associated with a separate LBA range. The write access module may store a write LBA range for each write access request in respective sets of registers included in the first registers. The example apparatus may also include a read access module for execution by the processor circuit that may receive a read access request to the storage medium associated with a read LBA range. The read access module may store the read LBA range to a set of registers included in the second registers. The example apparatus may also include a compare module for execution by the processor circuit that may compare the stored read LBA range to each of the stored write LBA ranges and determine whether the stored read LBR range overlaps with any one of the stored write LBA ranges.

According to some examples, the example apparatus may also include an assign module for execution by the processor circuit that may assign a separate index value to each stored write LBA range. For these examples, the separate index value may indicate a relative time of a given stored write LBA range for a given write access request compared to other stored write LBA ranges for other write access requests from among the plurality of write access requests. A higher index value may be associated with a more recent write access request. The example apparatus may also include a priority module for execution by the processor circuit that may compare index values for first and second stored write LBA ranges based on the first and second stored write LBA ranges overlapping with the stored read LBA range. The priority module may indicate which of the first and the second stored write LBA ranges has a higher index value to indicate a most recent write access request having an overlapping stored write LBA range with the stored read LBA range.

In some examples, the example apparatus may also include third registers. For these examples, the priority module may store an indication to the third registers to indicate the most recent write access request having the overlapping stored write LBA range with the stored read LBA range. According to some examples, the indication may include the index value assigned to the overlapping stored write LBA range.

According to some examples for the example apparatus, the write access module may store the write LBA range for each write access request such that the write access module stores a start write LBA in a first portion of registers for a respective set of registers from among the first registers and stores an end write LBA in a second portion of registers for the respective set of registers.

In some examples for the example apparatus, the read access module may store the read LBA range for the read access request such that the read access module stores a start read LBA in a first portion of registers for the set of second registers and stores an end read LBA in a second portion of registers for the set of second registers.

According to some examples for the example apparatus, the compare module may compare the stored read LBA range to each of the stored write LBA ranges such that the compare module may compare all the stored write LBA ranges to the stored read LBA range in a single clock cycle of the processor circuit.

In some examples for the example apparatus, the compare module may compare the stored read LBA range to each of the stored write LBA ranges such that the compare module may compare a first group of stored write LBA ranges to the stored read LBA range in a first clock cycle of the processor circuit and compare a second group of stored write LBA ranges to the stored read LBA range in a second, subsequent clock cycle.

According to some examples for the example apparatus, the write access module may receive an indication that a given write access request having a stored write LBA range in a respective set of the first registers has been completed before receiving the read access request. Also, for these examples, the example apparatus may include a mask module for execution by the processor circuit. The mask module may mask a determination of whether the read LBA range overlaps with the stored write LBA range such that the read LBA range is determined by the compare module to not overlap the stored write LBA range for the given write access request that has been completed.

In some examples for the example apparatus, the storage medium may include a solid state drive (SSD) having non-volatile memory that includes at least one of 3-dimensional cross-point memory, flash memory, ferroelectric memory, silicon-oxide-nitride-oxide-silicon (SONOS) memory, polymer memory, nanowire, ferroelectric transistor random access memory (FeTRAM or FeRAM), nanowire or electrically erasable programmable read-only memory (EEPROM).

In some examples, example methods may include receiving, at a processor circuit for controlling a storage medium, a plurality of write access requests to the storage medium, each write access request associated with a separate LBA write range. The example methods may also include storing a write LBA range for each write access request in sets of first registers. The example methods may also include receiving a read access request to the storage medium associated with a read LBA range and storing the read LBA range to a set of second registers. The example methods may also include comparing the read LBA range stored to the set of second registers to each of the write LBA ranges stored to the first set of registers and then determining whether the read LBA range overlaps with any one of the write LBA ranges.

According to some examples, the example methods may also include assigning a separate index value to each write LBA range. For these examples, the separate index value may indicate a relative time of a given write LBA range for a given write access request compared to other write LBA ranges for other write access requests from among the plurality of write access requests. A higher index value may be associated with a more recent write access request. Also, the example methods may include comparing index values for first and second write LBA ranges based on the first and second write LBA ranges overlapping with the read LBA range. An indication of which of the first and the second write LBA ranges has a higher index value may be made to indicate a most recent write access request having an overlapping write LBA range with the read LBA range.

In some examples, the example methods may also include indicating the most recent write access request having the overlapping write LBA range with the read LBA range by storing the index value in third registers. Also, the example methods may include accessing the third register and delaying the read access request until after the most recent write access request having the overlapping write LBA range is completed.

According to some examples for the example methods, storing the write LBA range for each write access request may include storing a start write LBA in a first portion of registers for a respective set of registers from among the first registers and an end write LBA in a second portion of registers for the respective set of registers.

In some examples for the example methods, storing the read LBA range for the read access request may include storing a start read LBA in a first portion of registers for the set of second registers and an end read LBA in a second portion of registers for the set of second registers.

According to some examples for the example methods, comparing the read LBA range to each of the write LBA ranges may include comparing all the write LBA ranges to the read LBA range in a single clock cycle of the processor circuit.

In some examples for the example methods, comparing the read LBA range to each of the write LBA ranges may include comparing a first group of write LBA ranges to the read LBA range in a first clock cycle of the processor circuit and comparing a second group of write LBA ranges to the read LBA range in a second, subsequent clock cycle.

According to some examples, the example methods may also include receiving an indication that a given write access request having a stored write LBA range in a respective set of the first registers has been completed before receiving the read access request. The example methods may also include masking a determination of whether the read LBA range overlaps with the stored write LBA range such that the read LBA range is determined to not overlap the stored write LBA range for the given write access request that has been completed.

In some examples for the example methods, the storage medium may include a solid state drive (SSD) having non-volatile memory that includes at least one of 3-dimensional cross-point memory, flash memory, ferroelectric memory, silicon-oxide-nitride-oxide-silicon (SONOS) memory, polymer memory, nanowire, ferroelectric transistor random access memory (FeTRAM or FeRAM), nanowire or electrically erasable programmable read-only memory (EEPROM).

In some examples, at least one machine readable medium comprising a plurality of instructions that in response to being executed on a system may cause the system to carry out the above mentioned example methods.

In some examples, at least one machine readable medium comprising a plurality of instructions that in response to being executed by a controller for accessing a solid state drive causes the controller to receive a plurality of write access requests to the storage medium, each write access request associated with a separate LBA write range. The instructions may also cause the controller to store a write LBA range for each write access request in respective sets of first registers. The instructions may also cause the controller to receive a read access request to the storage medium associated with a read LBA range and store the read LBA range to a set of second registers. The instructions may also cause the controller to compare the read LBA range stored to the set of second registers to each of the write LBA ranges stored to the first set of registers in a single clock cycle of a processor circuit for the controller and then determine whether the read LBA range overlaps with any one of the write LBA ranges.

According to some examples, the instructions may also cause the controller to assign a separate index value to each write LBA range. For these examples, the separate index value may indicate a relative time of a given write LBA range for a given write access request compared to other write LBA ranges for other write access requests from among the plurality of write access requests. A higher index value may be associated with a more recent write access request. The instructions may also cause the controller to compare index values for first and second write LBA ranges based on the first and second write LBA ranges overlapping with the read LBA range and then indicate which of the first and the second write LBA ranges has a higher index value to indicate a most recent write access request having an overlapping write LBA range with the read LBA range.

In some examples, the instructions may also cause the controller to indicate the most recent write access request having the overlapping write LBA range with the read LBA range by storing the index value in third registers. The instruction may also cause the controller to access the third register and delay the read access request until after the most recent write access request having the overlapping write LBA range is completed.

According to some examples, the instructions may also cause the controller to receive an indication that a given write access request having a stored write LBA range in a respective set of the first registers has been completed before the read access request has been received. The instruction may also cause the controller to mask a determination of whether the read LBA range overlaps with the stored write LBA range such that the read LBA range is determined to not overlap the stored write LBA range for the given write access request that has been completed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
a processor circuit to control access to a storage medium;
a write access module for execution by the processor circuit to receive a plurality of write access requests to the storage medium, each write access request associated with a separate logical block address (LBA) range, the write access module to store a write LBA range for each write access request in sets of registers included in first registers;
a read access module for execution by the processor circuit to receive a read access request to the storage medium associated with a read LBA range, the read access module to store the read LBA range to a set of registers in second registers;
a compare module for execution by the processor circuit to compare the stored read LBA range to each of the stored write LBA ranges to determine whether the stored read LBA range overlaps with any one of the stored write LBA ranges;
an assign module for execution by the processor circuit to assign a separate index value to each stored write LBA range, the separate index value to indicate a relative time of a given stored write LBA range for a given write access request compared to other stored write LBA ranges for other write access requests from among the plurality of write access requests; and
a priority module for execution by the processor circuit to compare index values for first and second stored write LBA ranges based on the first and second stored write LBA ranges overlapping with the stored read LBA range, the priority module to indicate which of the first and the second stored write LBA ranges has a most recent write access request that has an overlapping stored write LBA range with the stored read LBA range based on the comparison of the index values.

2. The apparatus of claim 1, comprising:
the assign module to assign the separate index value to each stored write LBA range such that a higher index value is associated with the more recent write access request; and
the priority module to indicate which of the first and the second stored write LBA ranges has a higher index value after the comparison of the index values to indicate the most recent write access request having the overlapping stored write LBA range with the stored read LBA range.

3. The apparatus of claim 1, comprising:
the priority module to store an indication to third registers to indicate the most recent write access request having the overlapping stored write LBA range with the stored read LBA range.

4. The apparatus of claim 3, comprising the indication to include the index value assigned to the overlapping stored write LBA range.

5. The apparatus of claim 1, the write access module to store the write LBA range for each write access request comprises the write access module to store a start write LBA in a first portion of registers for a respective set of registers from among the first registers and an end write LBA in a second portion of registers for the respective set of registers.

6. The apparatus of claim 5, the read access module to store the read LBA range for the read access request comprises the read access module to store a start read LBA in a first portion of registers for the set of second registers and an end read LBA in a second portion of registers for the set of second registers.

7. The apparatus of claim 1, the compare module to compare the stored read LBA range to each of the stored write LBA ranges comprises the compare module to compare all the stored write LBA ranges to the stored read LBA range in a single clock cycle of the processor circuit.

8. The apparatus of claim 1, the compare module to compare the stored read LBA range to each of the stored write LBA ranges comprises the compare module to compare a first group of stored write LBA ranges to the stored read LBA range in a first clock cycle of the processor circuit and compare a second group of stored write LBA ranges to the stored read LBA range in a second, subsequent clock cycle.

9. The apparatus of claim 1, comprising:
the write access module to receive an indication that a given write access request has a stored write LBA range in a respective set of the first registers that has been completed before the read access request has been received; and
a mask module to mask a determination of whether the read LBA range overlaps with the stored write LBA range such that the read LBA range is determined by the compare module to not overlap the stored write LBA range for the given write access request that has been completed.

10. The apparatus of claim 1, comprising the storage medium including a solid state drive (SSD) that has non-volatile memory that includes at least one of 3-dimensional cross-point memory, flash memory, ferroelectric memory, silicon-oxide-nitride-oxide-silicon (SONOS) memory, polymer memory, nanowire, ferroelectric transistor random access memory (FeTRAM or FeRAM), nanowire or electrically erasable programmable read-only memory (EEPROM).

11. A method comprising:
receiving, at a processor circuit to control a storage medium, a plurality of write access requests to the storage medium, each write access request associated with a separate logical block address (LBA) write range;
storing a write LBA range for each write access request in sets of first registers;
receiving a read access request to the storage medium associated with a read LBA range;
storing the read LBA range to a set of second registers;
comparing the read LBA range stored to the set of second registers to each of the write LBA ranges stored to the first set of registers;
determining whether the read LBA range overlaps with any one of the write LBA ranges;
assigning a separate index value to each write LBA range, the separate index value to indicate a relative time of a given write LBA range for a given write access request compared to other write LBA ranges for other write access requests from among the plurality of write access requests;
comparing index values for first and second write LBA ranges based on the first and second write LBA ranges overlapping with the read LBA range; and
indicating which of the first and the second write LBA ranges has a most recent write access request having an overlapping write LBA range with the read LBA range based on comparing the index values.

12. The method of claim 11, comprising:
assigning the separate index value to each write LBA range such that a higher index value is associated with the more recent write access request; and
indicating which of the first and the second write LBA ranges has a higher index value after comparing the index values to indicate the most recent write access request having the overlapping write LBA range with the read LBA range.

13. The method of claim 11, comprising:
indicating the most recent write access request having the overlapping write LBA range with the read LBA range by storing the index value in third registers;
accessing the third register and delaying the read access request until after the most recent write access request having the overlapping write LBA range is completed.

14. The method of claim 11, storing the write LBA range for each write access request comprises storing a start write LBA in a first portion of registers for a respective set of registers from among the first registers and an end write LBA in a second portion of registers for the respective set of registers.

15. The method of claim 11, storing the read LBA range for the read access request comprises storing a start read LBA in a first portion of registers for the set of second registers and an end read LBA in a second portion of registers for the set of second registers.

16. The method of claim 11, comparing the read LBA range to each of the write LBA ranges comprises comparing all the write LBA ranges to the read LBA range in a single clock cycle of the processor circuit.

17. The method of claim 11, comparing the read LBA range to each of the write LBA ranges comprises comparing a first group of write LBA ranges to the read LBA range in a first clock cycle of the processor circuit and comparing a second group of write LBA ranges to the read LBA range in a second, subsequent clock cycle.

18. The method of claim 11, comprising:
receiving an indication that a given write access request having a stored write LBA range in a respective set of the first registers has been completed before receiving the read access request; and
masking a determination of whether the read LBA range overlaps with the stored write LBA range such that the read LBA range is determined to not overlap the stored write LBA range for the given write access request that has been completed.

19. The method of claim 11, comprising the storage medium including a solid state drive (SSD) having non-volatile memory that includes at least one of 3-dimensional cross-point memory, flash memory, ferroelectric memory, silicon-oxide-nitride-oxide-silicon (SONOS) memory, polymer memory, nanowire, ferroelectric transistor random access memory (FeTRAM or FeRAM), nanowire or electrically erasable programmable read-only memory (EEPROM).

20. At least one non-transitory machine readable medium comprising a plurality of instructions that in response to being executed by a controller to access a solid state drive causes the controller to:
receive a plurality of write access requests to the storage medium, each write access request associated with a separate logical block address (LBA) write range;
store a write LBA range for each write access request in sets of first registers;
receive a read access request to the storage medium associated with a read LBA range;
store the read LBA range to a set of second registers;
compare the read LBA range stored to the set of second registers to each of the write LBA ranges stored to the first set of registers in a single clock cycle of a processor circuit for the controller;
determine whether the read LBA range overlaps with any one of the write LBA ranges;
assign a separate index value to each write LBA range, the separate index value to indicate a relative time of a given write LBA range for a given write access request compared to other write LBA ranges for other write access requests from among the plurality of write access requests;
compare index values for first and second write LBA ranges based on the first and second write LBA ranges overlapping with the read LBA range; and
indicate which of the first and the second write LBA ranges has a most recent write access request that has an overlapping write LBA range with the read LBA range based on the comparison of the index values.

21. The at least one non-transitory machine readable medium of claim 20, comprising the instructions to also cause the controller to:
assign the separate index value to each write LBA range such that a higher index value is associated with the more recent write access request; and
indicate which of the first and the second write LBA ranges has a higher index value after the comparison of the index values to indicate the most recent write access request having the overlapping write LBA range with the read LBA range.

22. The at least one non-transitory machine readable medium of claim 20, comprising the instructions to also cause the controller to:
indicate the most recent write access request having the overlapping write LBA range with the read LBA range by storing the index value in third registers; and
access the third register and delay the read access request until after the most recent write access request having the overlapping write LBA range is completed.

23. The at least one non-transitory machine readable medium of claim 20, comprising the instructions to also cause the controller to:
receive an indication that a given write access request having a stored write LBA range in a respective set of the first registers has been completed before the read access request has been received; and
mask a determination of whether the read LBA range overlaps with the stored write LBA range such that the read LBA range is determined to not overlap the stored write LBA range for the given write access request that has been completed.

* * * * *